May 26, 1936. W. BACKER 2,041,805
MANUFACTURE OF COAT HANGERS
Filed Nov. 23, 1935 13 Sheets-Sheet 1

INVENTOR
WILLIAM BACKER
BY
ATTORNEY

May 26, 1936.  W. BACKER  2,041,805

MANUFACTURE OF COAT HANGERS

Filed Nov. 23, 1935  13 Sheets-Sheet 4

INVENTOR
WILLIAM BACKER
BY
ATTORNEY

May 26, 1936. W. BACKER 2,041,805
MANUFACTURE OF COAT HANGERS
Filed Nov. 23, 1935 13 Sheets-Sheet 6

Fig. 7.

INVENTOR
WILLIAM BACKER
BY
ATTORNEY

May 26, 1936.  W. BACKER  2,041,805
MANUFACTURE OF COAT HANGERS
Filed Nov. 23, 1935  13 Sheets-Sheet 8

INVENTOR
WILLIAM BACKER
BY
ATTORNEY

May 26, 1936. W. BACKER 2,041,805
MANUFACTURE OF COAT HANGERS
Filed Nov. 23, 1935 13 Sheets-Sheet 9

INVENTOR
WILLIAM BACKER
BY Philip S. M⸺
ATTORNEY

May 26, 1936. W. BACKER 2,041,805
MANUFACTURE OF COAT HANGERS
Filed Nov. 23, 1935 13 Sheets-Sheet 13

INVENTOR
WILLIAM BACKER
BY
ATTORNEY

Patented May 26, 1936

2,041,805

UNITED STATES PATENT OFFICE 2,041,805

MANUFACTURE OF COAT HANGERS

William Backer, Schenectady, N. Y.

Application November 23, 1935, Serial No. 51,200

REISSUED

10 Claims. (Cl. 140—71)

This invention relates to the manufacture of garment hangers, particularly those of the type covered in Patent 2,023,392 of December 3, 1935.

Special objects of the invention are to accomplish the manufacture of such hangers rapidly and economically.

Other objects and the novel features and combinations of the new method are set forth or will appear in the course of the following specification.

The drawings accompanying and forming part of the specification illustrate preferred steps of the method and present preferred details of the machine, but it will be understood that both method and mechanism may be modified in various ways, all within the true intent and broad scope of the invention.

Figure 1:
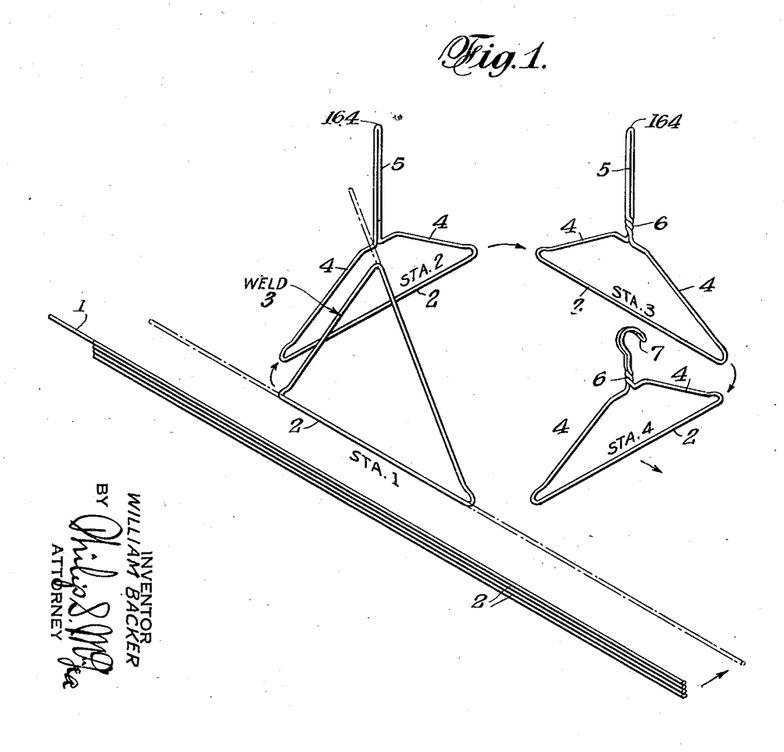
Fig. 1 is a perspective view illustrating somewhat diagrammatically various stages in the manufacture of the hanger.

In Fig. 1, the several steps of manufacture are shown as follows:

The wire 1, advancing at the left, is cut off in predetermined lengths 2, and these are transferred one at a time over to a first, bending and looping station, where the two ends of the wire are bent up as the sides of a triangle and the longer end, shown at the right, is bent down to meet the other end and there welded to the latter at 3, to form a continuous unitary triangular loop.

In the machine here disclosed, these triangle forming and welding operations are effected on one vertical face of a four-sided turret and on the completion of such operations, the turret turns to carry the triangular loop to a second station.

At the second station, the sides of the triangular loop are bent in to produce the shoulder forming portions 4, of the hanger and to bring those parts which formed the apex of the triangle into the close lying parallel relation shown at 5, forming an upwardly projecting double stranded stem or shank having a looped, rounded upper end.

In succeeding stages, the doubled shank or stem portion is bent to form a hook and is twisted at the base of this hook. The order of these steps may vary, that is, the twisting be effected before the hook is formed.

Actually, in the machine illustrated, the turret turns to a third station and there the parallel strands are twisted at the base at 6, approximately one and three-quarter turns and finally at a fourth station, the doubled, looped upper end of the stem is bent into the form of a supporting hook 7, with the two strands of the same parallel to and overstanding the shoulder portions of the hanger.

The bringing of the ends of the wire together and securing them thus to form a continuous loop, gives the stock a certain rigidity and strength, causing it to hold its shape and greatly facilitating the subsequent bending and forming operations. Also this eliminates any loose or projecting ends to deal with in the subsequent forming and finishing of the article.

Figure 2:
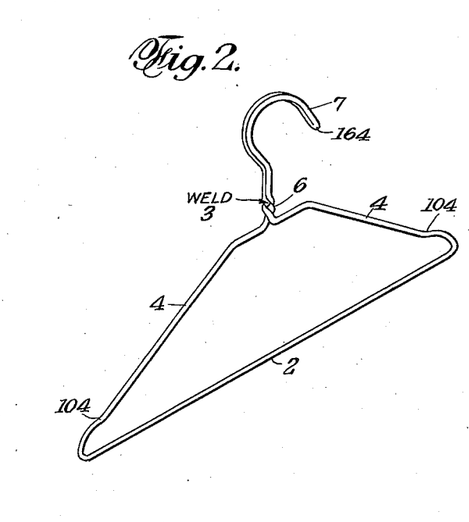
Fig. 2 is a perspective view on a larger scale of one of the completed hangers.

As appears particularly in Fig. 2, the weld is preferably located so as to come in the twisted neck of the hook where it is to an extent "sunk" between adjoining turns and protected thereby, but it is within contemplation of the invention that the weld or other form of joint be located elsewhere, for example, in the spreader bar portion at the bottom of the hanger, beneath one of the shoulder forming portions.

Figure 8:
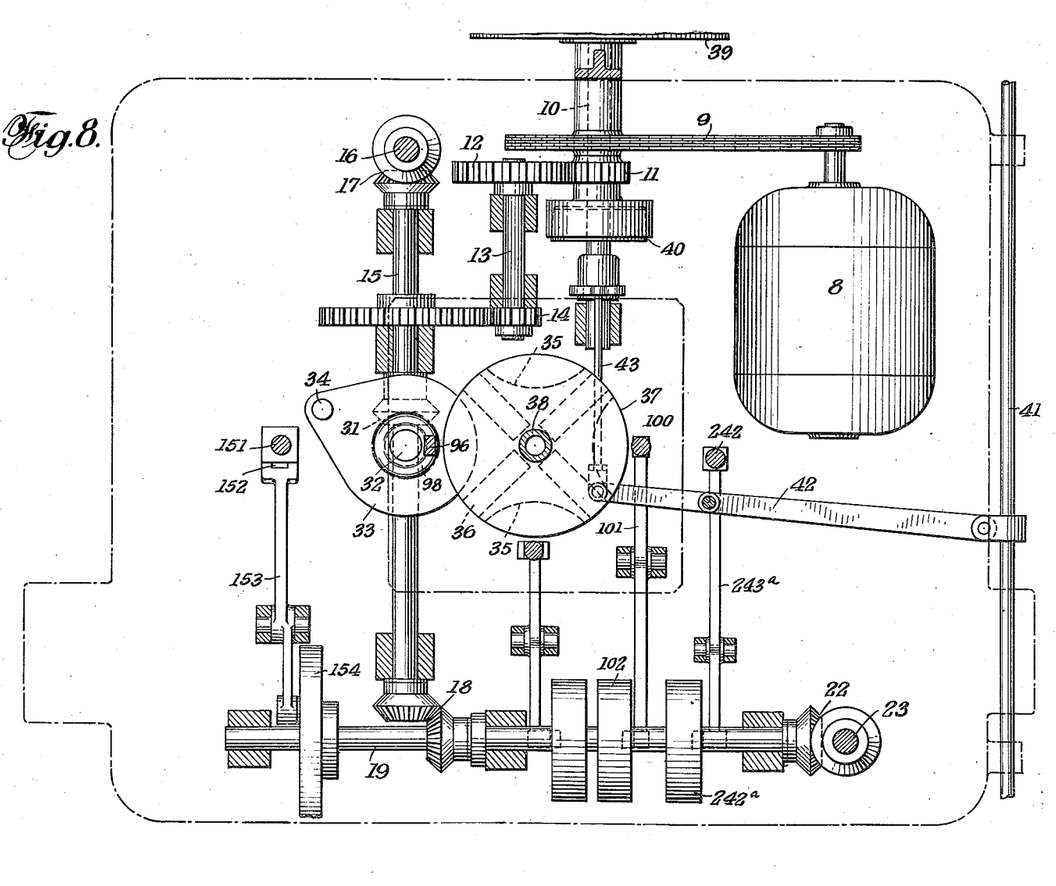
Fig. 8 is a horizontal sectional and broken plan view as on substantially the plane of line 8—8 of Fig. 4, illustrating in particular details of drive gearing.

Operation of the machine illustrated may be understood by consideration first of the driving train shown in Fig. 8. There a motor 8, is indicated driving through belt or silent chain connections 9, a shaft 10, carrying a pinion 11, in mesh with gear 12, on an intermediate shaft 13, driving through gears 14, a horizontal shaft 15, which at one end drives an upright shaft 16, through bevel gearing 17, and at the opposite end through bevel gearing 18, operates a horizontal shaft 19, parallel with the front of the machine. The upright shaft 16 at the back of the machine drives through bevel gearing 20, at its upper end, Fig. 3, a horizontal cam shaft 21, at the back of the machine and the shaft 19 through bevel gearing 22, Fig. 4, operates an upright shaft 23, which through bevel gearing 24, drives a horizontal cam shaft 25, at the front of the machine. The latter through bevel gearing 26, Figs. 3 and 4, drives a horizontal shaft 27, which is connected by gearing 28, to the upper and lower cooperating sets of wire feeding rolls 29, 30. The shaft 15 running from front to rear of the machine also, through bevel gearing 31, Figs. 5 and 8, operates the upright shaft 32, carrying the disc 33, and pin 34, for cooperating respectively with the partial circular recesses 35, and radial slots 36, of the disc element 37, forming the other member of the Geneva gear for intermittently rotating the turret, said member being fixed on the lower end of the turret shaft 38.

Figure 7:
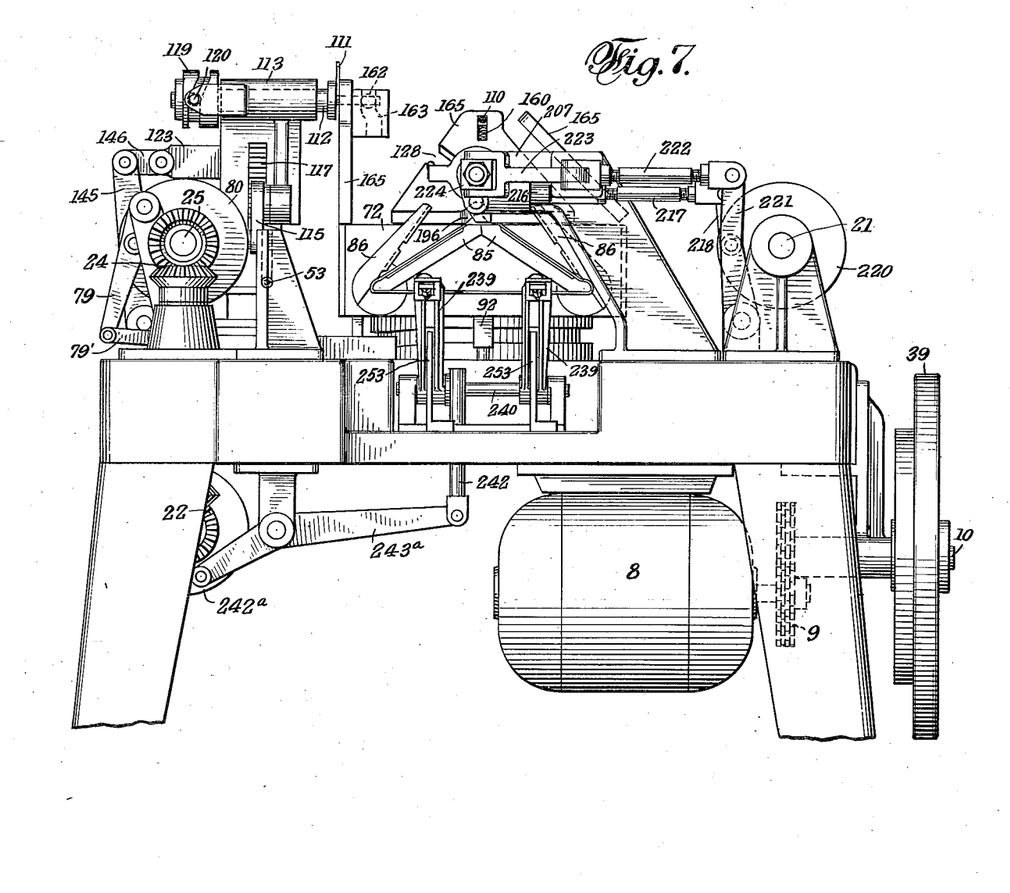
Fig. 7 is a like view of the right hand end of the machine illustrating the mechanism for the fourth and final set of operations.

A hand wheel 39, Figs. 7 and 8, enables the shaft 10, to be rotated manually, for setting up the machine and the like, and a clutch 40, on the shaft 10, controlled from a slide rod 41, through lever and link connections 42, 43, enables the machine to be stopped and started at will, without recourse to the motor switch.

Figure 3:
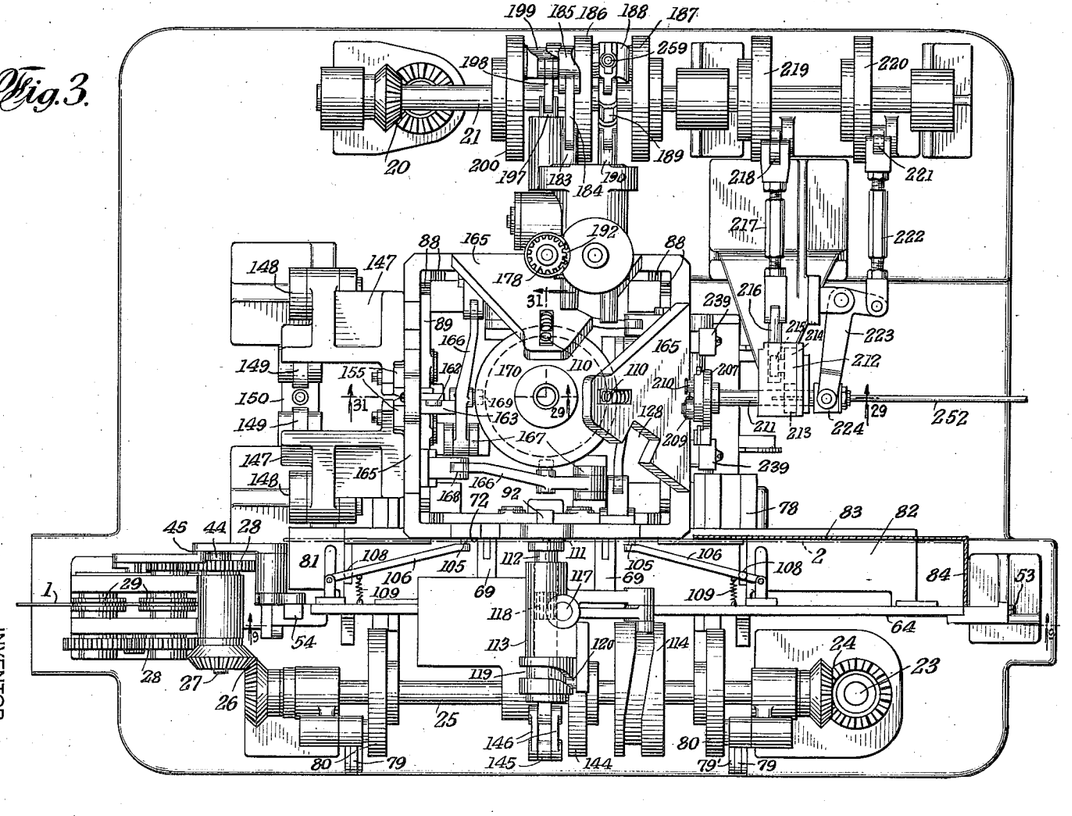
Fig. 3 is a top plan view of the machine.
Figure 4:
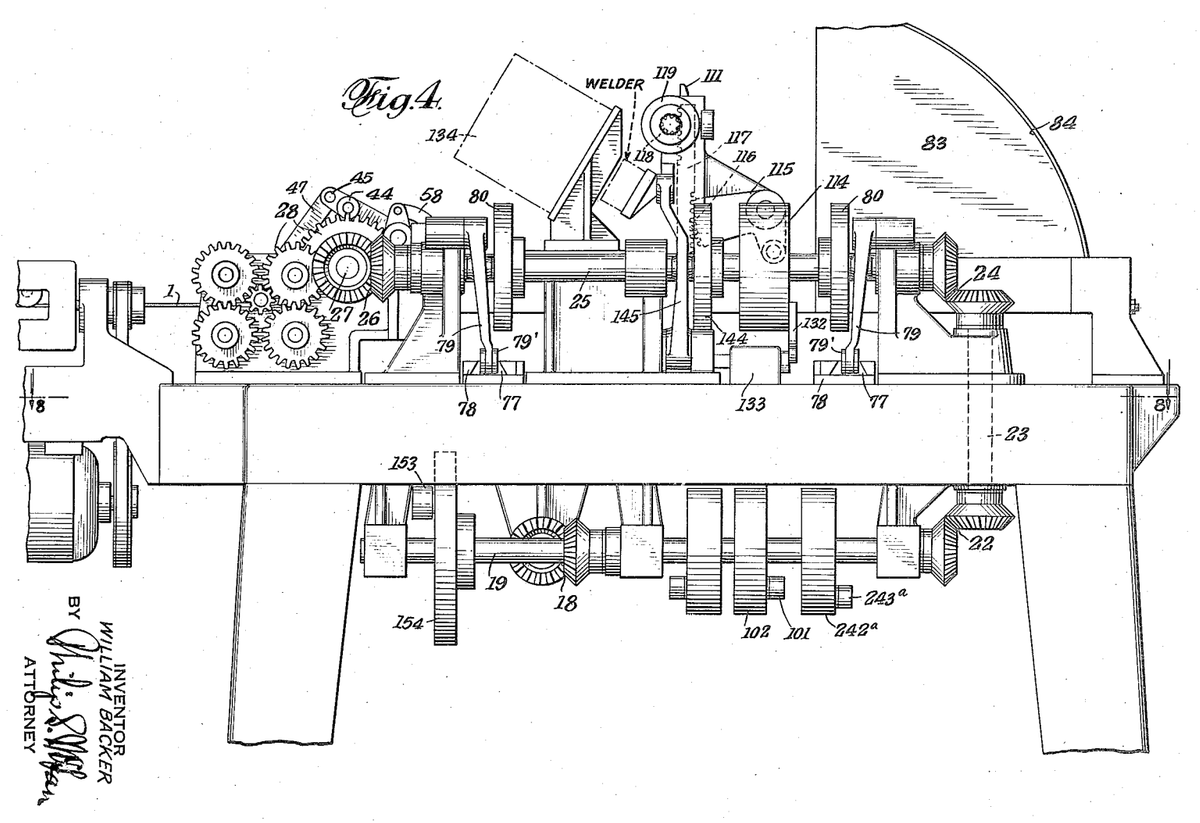
Fig. 4 is a broken side elevation, showing the front of the machine including the mechanism for effecting the first stage of operations.
Figures 31, 32:
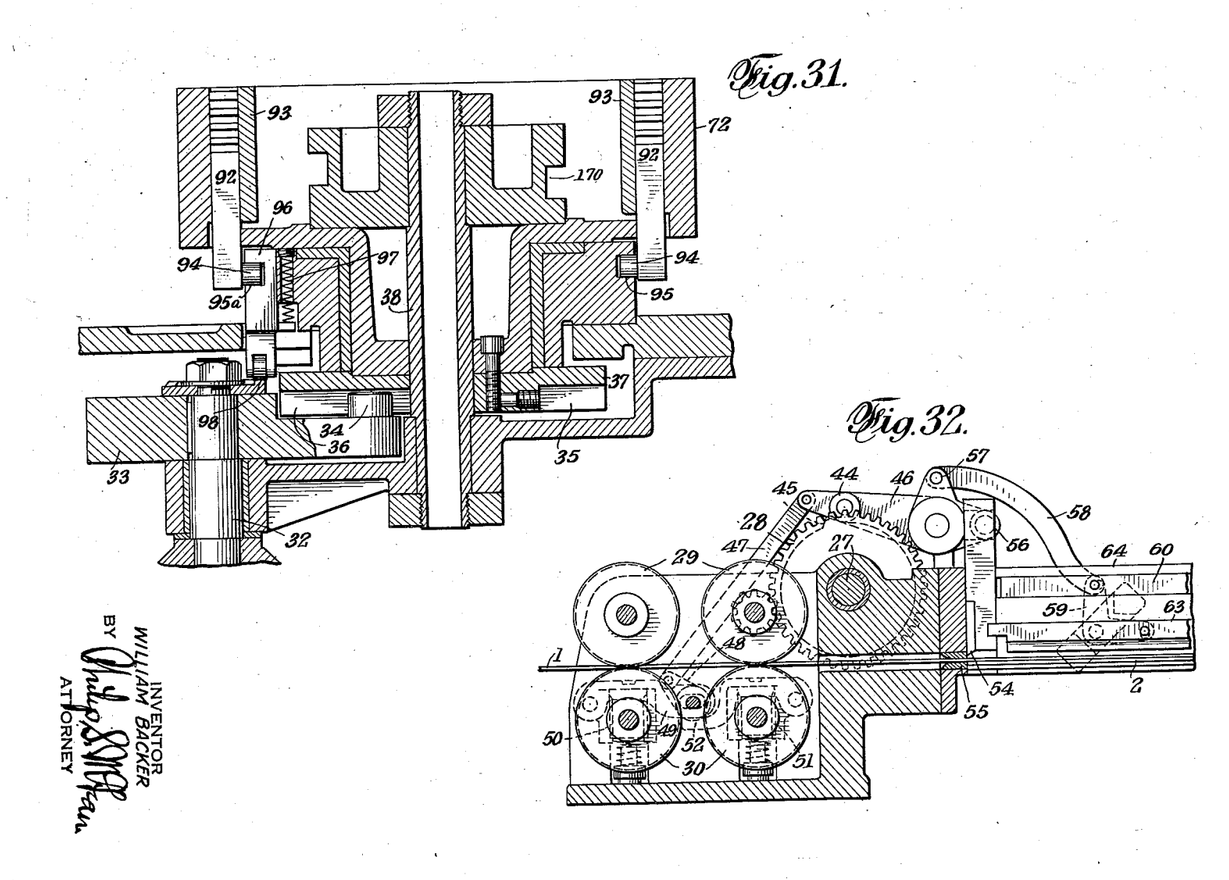
Fig. 31 is a broken vertical sectional view of the turret intermittent gear and cam mechanisms showing these parts as on the two planes indicated by lines 31—31, Fig. 3.
Fig. 32 is a broken and part sectional detail view of the feed rolls, cut off and wire lowering mechanism.

With the form of wire feed shown, the cooperating upper and lower sets of rolls 29, 30, Figs. 3, 4 and 32, run continuously, but are separated intermittently by a cam 44, on shaft 27, coacting with roll 45, on lever 46, connected by link 47, with a rocker 48, overstanding and arranged to depress the lever 49, bearing on the spring supported journal box 50, of one lower feed roll, the other roll 30, also being mounted in a spring supported journal box 51, arranged to be depressed by a lever 52, acted on by the first lever 49.

Figure 9:
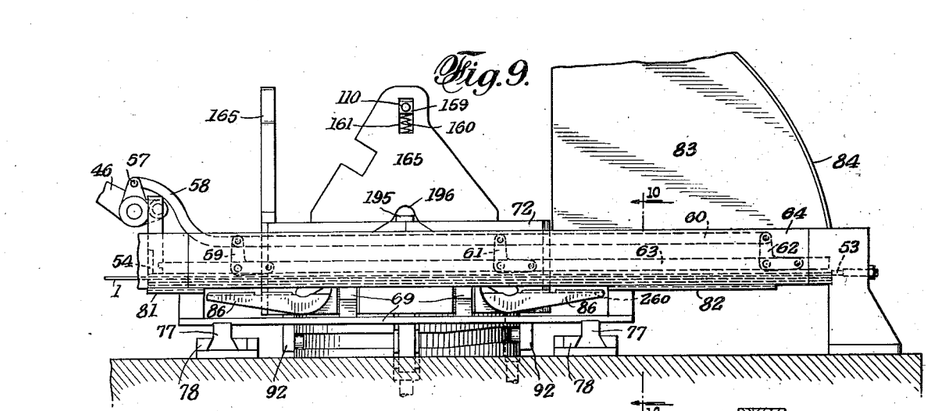
Fig. 9 is a broken part sectional view substantially as on the plane of line 9—9, Fig. 3, illustrating particularly transfer of the cut wires to the operating turret.

The cam 44 is timed to separate the feed rolls approximately at the instant the wire reaches the front stop 53, Figs. 3 and 9, and substantially as this occurs, the advanced length of wire is cut off by a knife 54, Fig. 32, shown as reciprocating vertically across the end of the wire guide 55, and actuated through a connection at its upper end at 56, with the cam lever 46. This same cam lever has an additional function in that through a connection at 57, with a link 58, it serves to rock a bell crank 59, connected through horizontally reciprocating link 60, with other similar bell cranks, 61, 62, Figs. 9 and 14, the horizontal arms of these bell cranks all connected with a vertically operating slide bar 63, mounted in a supporting and guide structure 64, over the cut length of wire.

Figures 12, 14:
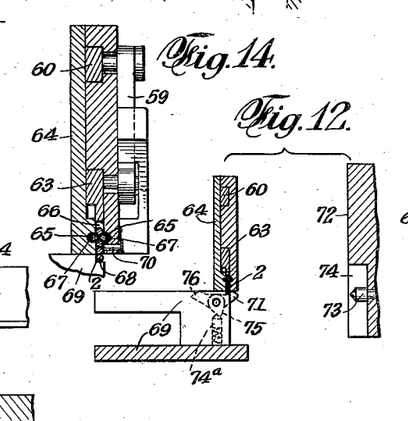
Figs. 12 and 13 are broken sectional details of the transfer mechanism for carrying the single wires from the cut-off station over to the face of the turret.
Fig. 14 is a broken part sectional detail on a larger scale of the mechanism for lowering the cut length down onto the transfer slide.

For supporting the cut wire full length, the rods or wires 65, 65, are mounted at opposite sides of the wire feed channel 66, Fig. 14, in yielding seats 67, so that they will spread relatively, under downward push of the slide bar 63, to pass the cut length down into position on a step 68 on the wire feeding slide 69. Actually, the channel 66 may be deep enough to contain two or three, or more cut lengths of wire, above the feed slide and, in Figs. 12, 13 and 14, the structure is such as to accommodate a total of four cut lengths including that one on the step of the feed slide. One or any number of spring pressed detents 70, may be provided for resiliently holding the cut lengths in place and for separating the length in the bottom of the channel from those above it.

Figure 13:
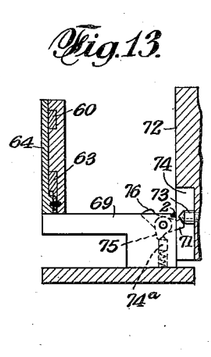

The wire length which is released to the feed slide is held in the recess or seat at the front edge of that slide by a hooked detent or dog 71, Fig. 12, which, as the slide reaches the adjoining face of the turret 72, Fig. 13, strikes against and is depressed by an inclined abutment 73, located in a recess 74, in the face of the turret. The rocking detent 71 remains in this releasing position on the return stroke of the feed slide due to the holding force of a spring plunger 74a, acting against one side of the cam 75, on the back of the detent. As the detent on the feed slide approaches the guide 64, an inclined arm 76, of the detent rides under the overstanding guide structure 64, and rocks the detent back to the retaining position where, as shown in Fig. 12, it is then held by the spring plunger 74a, acting on the opposite face of the detent holding cam 75.

Figure 10:
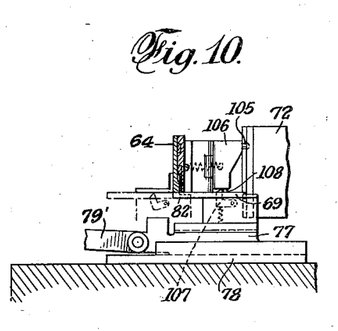
Fig. 10 is a broken part sectional detail of these parts, substantially as on the plane of line 10—10 of Fig. 9.

The reciprocating carriage or feed slide 69, as it has here been termed, is shown in Figs. 3, 4, 9, 10 and 11, carried by keys 77, operating in undercut keyways 78, and as reciprocated in properly timed relation by the rock levers 79, actuated by cams 80, on the front cam shaft 25 and connected at their lower ends with the slides proper 77, by links 79' as appears in Figs. 7 and 10.

Figure 11:
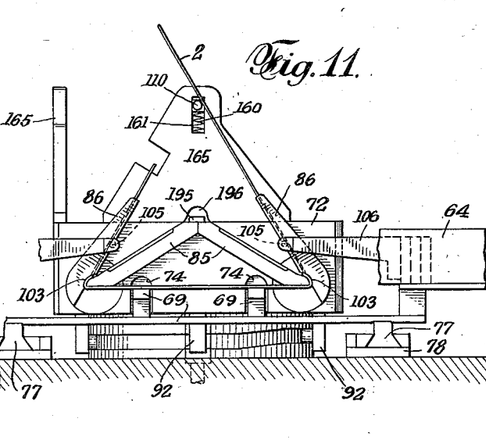
Fig. 11 is a view generally similar to Fig. 9, showing the first set of benders as having folded the ends of the wire up over the shoulder outlining dies on the face of the turret.

The feed slide 69 is shown in Figs. 9 and 11, as having side wing extension 81, 82, for supporting the relatively short and long ends of the wire which project beyond the ends of the turret 72, and over the longer support 82, there is provided a gage wall 83, shown in Fig. 3, as substantially in line with the face of the turret and as carrying a circumferential wall 84. These angularly disposed walls 83 and 84 form guards for the longer ends of the wires as they are bent up as later described and assist in keeping these bending end portions in line with the face of the turret.

In advancing to the adjoining face of the turret as described, the cut wire passes beneath the shoulder forming dies 85, 85, on the face of the turret, Fig. 11 and at a time when the shoulder forming benders 86, 86, are lowered below the wire transfer path, as in Fig. 9. These benders rotating across the face of the turret, are carried by shafts 87, journalled in the sides of the turret and provided at the inner faces of these side walls with pinions 88, engaged by the gear segments 89, pivoted at 90, and having the shorter oppositely extending gear segments 91, cooperating with opposite sides of the double, vertically sliding racks 92, Figs. 3 and 29. These double racks operate in vertical guides 93, in the turret sides and carry at their lower ends inwardly projecting rolls 94, riding in the stationary cam track 95, about the bottom of the turret, Figs. 29 and 31.

At the second and fourth stations of the turret, that is, at the left and right hand sides of the turret in Fig. 3, the stationary cam track 95 is interrupted to admit slides which receive the rack rolls 94 and impart in the first instance, a further closing movement to the benders 86, and, in the second instance, a reverse opening movement of the benders to release the completed article from the turret. The portion appearing at the left in Fig. 3, is on a plane taken through the second or left hand station and this view shows the slide 96, operating vertically across the cam track 95, and having a short cam track section 95a, receiving the rack bar cam roll 94. This slide is depressed by spring 97, against a cam 98, on top of the Geneva gear member 33, timed to effect a further closing in movement of the benders 86, at the second station, after such movement has been initated by a second set of benders to be later described.

Figures 29, 29A, 30:
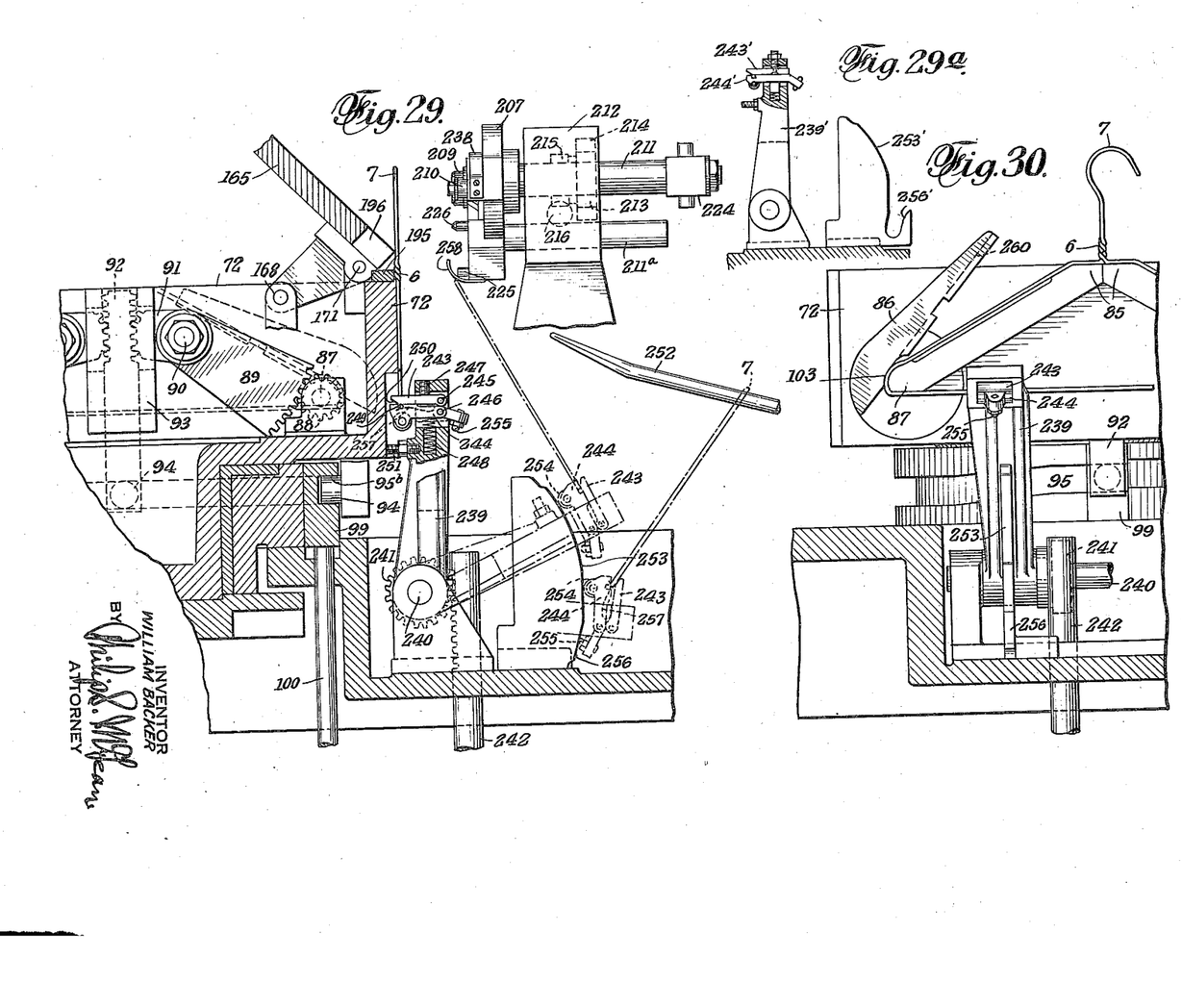
Fig. 29 is a broken sectional view of parts at the fourth station of the machine, as on generally the plane of line 29—29 of Fig. 3, and showing in addition to the hook forming mechanism, the oscillating gripper for taking off the finished hangers.
Fig. 29a is a broken sectional detail of a slightly modified form of gripper mechanism.
Fig. 30 is a broken part sectional view of the gripper mechanism of the gripper and other parts as seen looking directly toward the face of the turret.

The slide at the fourth station for effecting the opening of the primary benders 86, is shown at 99, Figs. 29 and 30, having a cam track portion 95b, receiving the rack roll 94 and adapted to be pulled down by rod 100, Fig. 8, operated through lever 101, from the cam 102, on the lower front cam shaft 19.

Figs. 11 and 30 show how the bending arms 86, carry the end portions of the wire up over and around the shoulder formers 85, and how the cooperating, concentrically shaped concave and convex portions at 103, on these benders and formers set the wire inwardly in the form of inwardly curved shoulders 104, Fig. 2, for settling and holding the garment in place on the hanger.

The inward dips thus pressed in the shoulder portions of the hanger would carry the ends of the wire further than desired in producing the triangular formation shown started in Fig. 11. To restrain and hold the free ends against such movement, stops 105, are provided on the ends of arms 106, which as shown in Fig. 3, are swung to carry the stops in position in front of the wire and retracted to clear them of the wire and the turret, after the bending operations at this first station. As shown in Fig. 10, the arms 106, are swung inward toward the turret by spring pressed dogs 107, on the transverse slide engaging rollers 108, on the arms in the inward movement of the slide and the retraction of the arms is effected by the springs 109 as the slide retreats.

The movement of the bender arms 86, from the position shown in Fig. 9, to that in Fig. 11, is sufficient to carry the end portions of the wire up over the shoulder formers 85, far enough to produce a substantially triangular figure when the ends of the wire are joined together. Where the joint is made in the left hand side of the triangle, as in the illustration, the right end portion of the wire is left long enough to be bent down over a top guide 110, and to then reach the shorter left hand end portion of the wire. The condition prior to bending the longer upper portion down into engagement with the shorter end portion is illustrated in Fig. 11. With the parts in such relation, a top bender 111, Figs. 3, 4, 7 and 15, carried by shaft 112, rotatably and slidably mounted in the bearing 113, is rotated and advanced toward the turret face by means including the cam 114, on the front, top cam shaft 26, operating the rocker 115, which has a gear segment 116, in mesh with one side of the double faced rack 117, which engages a wide faced pinion portion 118, on the shaft 112, this shaft also carrying a cam 119, at its outer end engaged by a stationary cam roll 120. This fixedly supported cam roll, through the medium of cam 119, as the shaft rotates in one direction, has the effect of advancing the top bender 111, toward the face of the turret, holding it there while this bender turns the upwardly projecting end of the wire over the top guide 110, down substantially into abutment with the lower end of the wire Fig. 15, and then as the shaft turns reversely, the effect of retracting the shaft to remove the bender from the indexing path of the turret.

Figure 15:
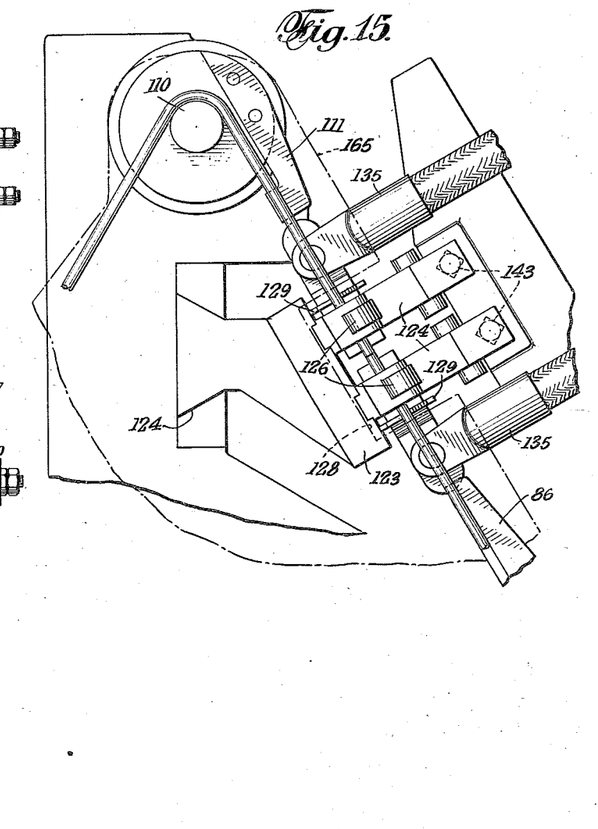
Fig. 15 is a broken view of the top bender and the welder as they appear facing the turret.

As the ends of the wire are brought together into a complete triangular loop, by bending from the Fig. 11 to the Fig. 15 position, they are secured by a substantially instantaneous butt welding operation effected by the instrumentalities shown particularly in Figs. 3, 7 and 15 to 19, and comprising welding clamps which grip the wire ends and then press them together as the welding current is thrown on.

The two welding clamps are alike in that they consist each of relatively fixed and movable jaws 121, 122, mounted on a carriage 123, sliding in a guide 124, toward and away from the turret face. The movable welding jaws 122, are shown carried by levers 124, pivoted on the fixed jaws at 125, Fig. 17 and having rollers 126, to engage pivoted spring pressed abutments 127, on the inner faces of the turret side walls. These walls are cut out or notched as indicated at 128, to admit the welding clamps into the plane of the wire and to relatively center the jaws and the wire. The fixed jaws are shown as carrying guides 129, having the inwardly convergent wire entrances 130. The movable jaws are acted on by jaw opening springs 131, Fig. 17, so that the jaws stand open as in Fig. 18, as they approach the wire ends and the movable jaws close down over the wire, as the wire is centered by the convergent guides 130, in respect to the fixed jaws. The spring pressed abutments 127, serve to hold the clamping jaws closed under yielding spring force, allowing for unevenness or variations in the size of the wire.

At approximately the time the welding clamps obtain a firm grip on the wire ends, a cam 132, Figs. 3 and 4, on the front cam shaft 25, operates a switch 133, to throw on current through the welding transformer 134, which has suitable electrical connections 135, Fig. 15, with the two welding clamps.

Figures 16, 17, 18, 19:
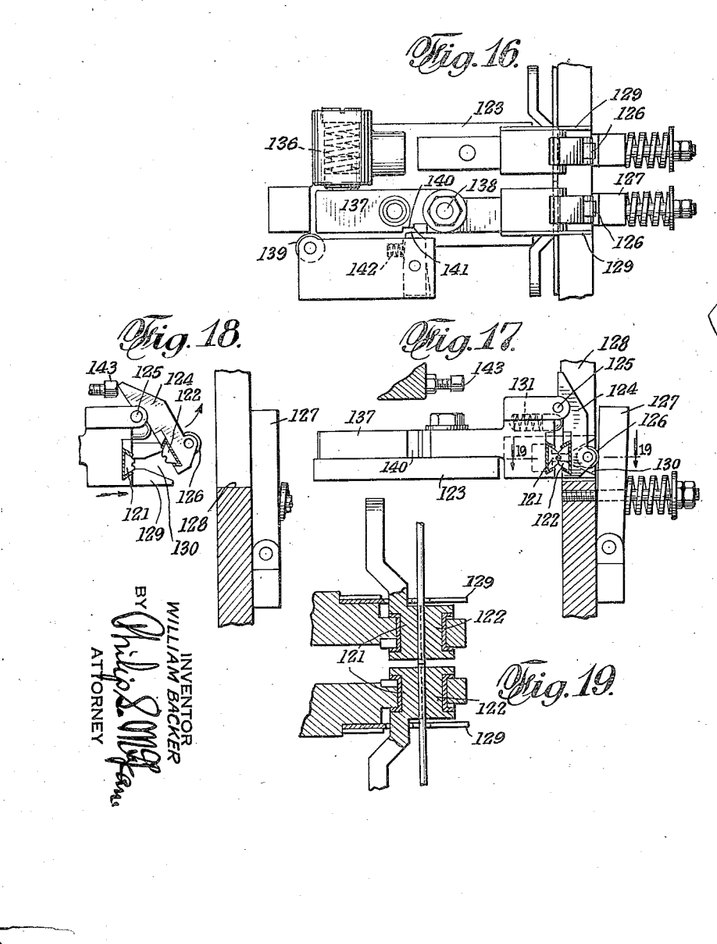
Fig. 16 is a broken part sectional detail of the opposite side of the welder showing the welding clamps in the act of applying welding pressure to the wire ends.
Figs. 17 and 18 are broken part sectional details illustrating the welder jaws in closed and open positions respectively.
Fig. 19 is a broken sectional detail of the welding clamps or jaws and guides for the wire ends as on substantially the plane of line 19—19 of Fig. 17.

Pressure is applied during the actual welding of the wire ends by the means shown particularly in Fig. 16, and comprising a spring 136, acting on the leverage extension 137, of one of the welder clamps which is pivotally supported at 138, so that under the force of this spring, it may move toward the other welder clamp. This pressure becomes effective however, only after the tail of the lever 137 has passed inward over the supporting roller 139, Fig. 16 and a recess 140, in that lever has come into register with a cam faced spring actuated holding dog 141. The incline of this dog and the force of this spring 142, which holds it up into position, together with the shape and position of slot 140, determine the timing and effect of this welding pressure.

As the welder is retracted, the movable welding jaws spring open to clear the connected wire and in order that these open jaws will not interfere with the indexing of the turret they are closed again in the extreme outer position of the welder by the tails of the movable jaw levers 124, contacting with properly positioned stops 143, Fig. 17.

The advancing and retracting movements of the welder are effected in the illustration from cam 144, on shaft 125, operating a lever 145, connected by links 146, with the outer end of the welder slide 123, Figs. 3 and 7.

Figure 5:
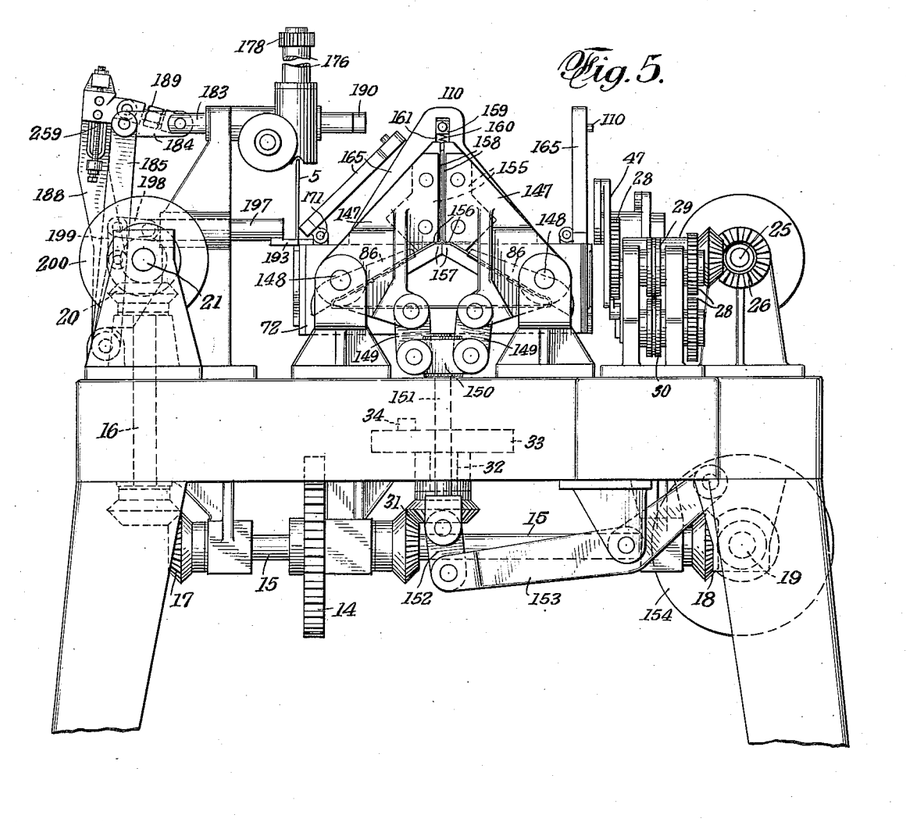
Fig. 5 is a similar view of the left hand side of the machine where the second set of operations are accomplished.

After the operations described of transferring a wire to the turret, bending the ends of the wire up over shoulder formers on the face of the turret and then bringing the ends of the wire together and butt welding them in a triangular formation, the turret is indexed, righthandedly in Fig. 3, to carry the triangular loop of wire to the second bending and forming station, at the left in this view and appearing in elevation in Fig. 5.

Opposite the face of the turret at the second station are a pair of opposed levers 147, pivoted at 148, and having connected to their lower ends links 149, shackled to a head 150, on the upper end of a vertically extending rod 151, connected at its lower end by linkage 152, to a cam lever 153, which is oscillated by a cam 154, on the front lower cam shaft 19. The arms or levers 147, carry at their upper ends the bending dies 155, which come in over the face of the turret and are shaped to break in the upwardly convergent sides or apex of the triangle into the form illustrated at the upper left in Fig. 1, with the shoulder forming portions of the hanger completed at 4, and the double strand looped shank or stem 5, rising from the neck portion of the hanger.

In the illustration, these bending dies 155, Fig. 5, have the inwardly angled portions 156, to carry the wire in closely over the neck shaping formers 157, on the face of the turret and above that the opposed straight edge portions 158, to bring the strands of the doubled stem into close, substantially abutting parallel relation.

The top guide 110, serves as a former for the apex of the triangle and is yieldingly supported so as to permit the wire ends to be forced together in the welding operation and so as to permit the folding in of the sides of the triangle as last described.

In the illustration, Figs. 3, 5, 7, 11, the wire guiding and forming pin 110, is shown slidingly mounted in a block 159, supported by spring 160, in a vertical guide slot 161, in the wall of the turret and as having a transverse lug or roll 162, at the rear riding in a cam track 163, which will automatically withdraw the pin from within the loop as the wire is drawn down in breaking in the sides of the triangle. The tip of the forming pin may be rounded off as indicated to enable the loop at the tip of the triangle to fold in smoothly and form a clean smoothly rounded bend for the tip of the hook, as illustrated at 164, in Figs. 1 and 12. When the collapsing loop of wire releases the forming pin 110, the latter is returned automatically to the upper position by its supporting spring 160.

After the arms 147, at the second station bend in the sides of the triangular loop into the final shoulder and neck forming positions of the hanger, or as a part of that bending operation, the first set of benders 86, are folded inward from the position shown in Fig. 11, to that indicated in Fig. 5, by the means previously described and comprising the slide 96, Fig. 31, operated by cam 98, to lift the double rack 92, and swing the bender arms 86, fully inward over the upper surfaces of the shoulder forming dies 85.

As the turret indexes to the next, third station, illustrated at the right hand side of Fig. 31, the first bender rack 92, will be held up by the stationary cam track 95, so that the first set of bender arms will retain and firmly hold the partially formed hanger on the turret face. This cam track 95, serves furthermore to hold these benders in this retaining position during travel from the third station to the fourth, discharge station. After the second set of bending arms 147, open up and provide clearance for turning of the turret, the latter is indexed from the second to the third station, shown at the top in Fig. 3 and more generally in Fig. 6.

In the turning of the turret from the second to the third station, the upper hingedly mounted section 165, of the turret wall is folded inwardly and downwardly as at the left in Fig. 5, to leave the parallel strand shank of the hanger clear for engagement of the twister thereover. The mechanism for this purpose is shown as consisting in each instance, Fig. 3 of a lever 166, pivoted at one end in the turret at 167, pivotally connected at its opposite end by a link 168, with a lug on the back of the folding panel 165, and having a cam roll 169, in its intermediate portion engaging a stationary cam track 170, at the center of the turret, Fig. 31. The latter is so constituted as to drop back the folding upper panels 165, as the face of the turret passes from the second to the third station and to hold these panels lowered in the continuance of travel from the third to the fourth station and finally to raise the panels to the vertical upstanding relation in the travel from the fourth back to the first position, as will be understood from Fig. 3. The hinges on which these folding panels turn are indicated at 171, in Fig. 5, and in outline these panels or upper extensions of the turret walls may be of generally triangular shape, so as to form only the necessary guiding surfaces for the upwardly turned ends of the wires being bent to the triangular formation indicated in Fig. 11. The top former pins 110, and the mechanism for yieldingly supporting and automatically retracting the same are carried by and mounted on these folding sections of the turret side walls.

Figures 20, 21, 22, 23:
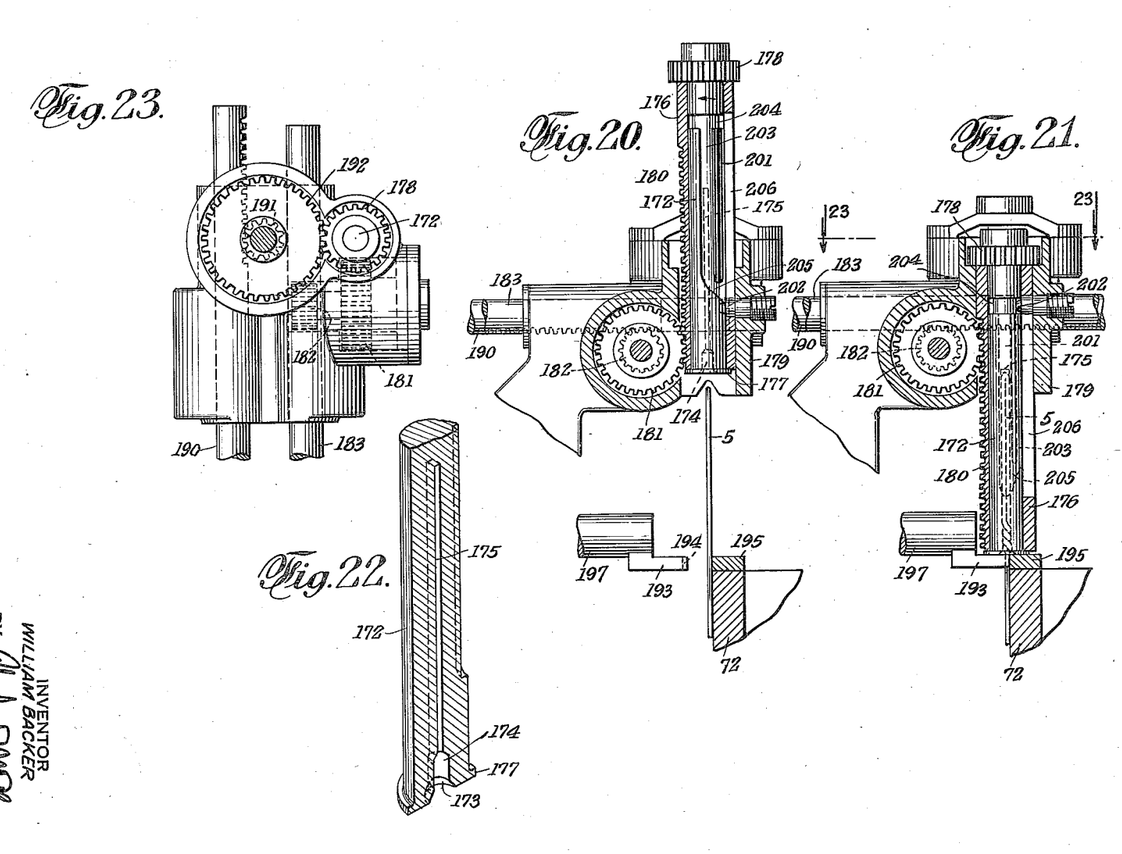
Figs. 20 and 21 are broken sectional views of the wire clamping and twisting mechanism, showing the twister head in raised and lowered positions respectively.
Fig. 22 is an enlarged broken sectional detail of the wire twisting arbor.
Fig. 23 is a broken horizontal sectional view taken as on the plane of line 23—23 of Fig. 21 and showing in particular the rack mechanism for raising and lowering and for rotating the twister.

The twister consists in the machine illustrated of a shaft or arbor 172, Figs 20 and 23, having a bevelled entrance 173, for the rounded upper end of the double strand shank, a short cylindrical cavity 174, for the twist to be formed in the shank and a long flat bore 175, to receive and grip the strands in their closely doubled parallel relation. This twisting element is rotatably confined in a raising and lowering sleeve 176, by an annular flange 177, at the lower end of the element and a pinion 178, at the upper end of the same. This sleeve 176 is confined in a vertical bearing 179 and has a rack 180, in one side of the same engaged by gear 181, carrying a pinion 182, engaged by horizontal rack 183. The latter is actuated through linkage 184, Fig. 5, from a lever 185, operated from cam 186, on the back cam shaft 21, Fig. 3.

The rotary movement of the twister is obtained from a cam 187, on the same cam shaft 21, operating a lever 188, connected by linkage 189, with horizontal rack 190, in engagement with a pinion 191, carrying a gear 192, to mesh with pinion 178, on the upper end of the twister shaft.

While the twister is operating the base of the double strand shank is preferably held by a clamp 193, Figs. 20 and 21, slotted at 194, to receive the two strands and to hold them against a companion abutment piece 195, on the upper edge of the fixed portion of the turret wall. The folding panel part of the wall is suitably recessed as indicated at 196, Figs. 9 and 11, to pass this abutment clamp.

Figure 6:
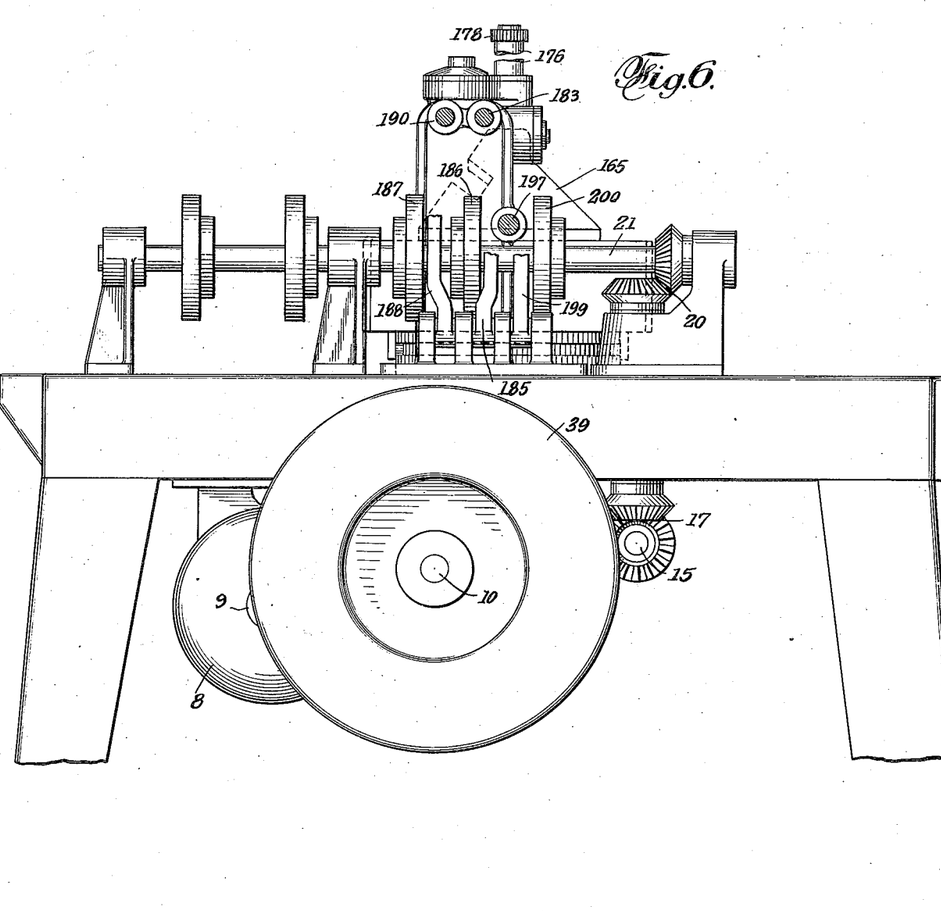
Fig. 6 is a broken side elevation of the back of the machine where the third set of operations are accomplished.

As the turret finishes its turning movement to bring the shank of the hanger blank beneath the twister, the holding clamp 193, is advanced by the rack 197, which carries it, through linkage 198, Fig. 5, connected with lever 199, operated by cam 200, on shaft 21, Figs. 3, 5 and 6.

The parts are usually so timed that as the clamp 193, Fig. 20, comes in to grip the doubled strand shank, the twisting shaft 172, will come straight down over the shank and then approximately as it reaches the lower end of its stroke and the pinion 178 on the upper end of the same has meshed the gear 192, Fig. 23, the rack 190, will rotate the gears to form the twist indicated in Fig. 21.

The purpose of giving the double strand shank a fractional turn, one and three-quarter turns in the illustration, is to leave the two strands twisted at a right angle with respect to the general plane of the hanger, substantially as indicated in the upper right hand portion, Fig. 1. To permit this operation and to return the twister head back to its initial position, the twisting shaft 172, is shown as having a straight vertical groove 201, Fig. 20, receiving the stationary guide pin 202, and a parallel approximately quarter turn displaced cam groove 203, the two connected at the upper ends by the complete annular groove 204, and connected at the lower ends by a short inclined groove 205. The raising and lowering sleeve 176, has a vertical slot 206, passing the shank of the guide stud 202, so that the latter serves as a key to prevent the rack sleeve 176 from turning. In the downward movement, the guide stud 202 by its engagement in the long vertical groove 201, holds the twister shaft lined up to properly engage down over the parallel strands of the hanger shank. At the bottom of this movement, as the annular portion 204 reaches the guide pin 202, the twister shaft is free to be turned to impart the necessary twist to the shank. Then as the twisting is completed, with the two strands turned out of the plane of the hanger, the other so-called quarter turn groove 203, registers with the guide pin 202, permitting the twister element to be raised in this approximately quarter turn position and then as the upper position is approached, after letting go of the end of the shank, the inclined portion 205, of the groove turns the twister shaft back into its initial position, ready for the next operation.

As the turret turns from the third to the fourth station appearing at the right in Fig. 3 and shown in detail in Figs. 7, 29 and 30, the upstanding twisted shank comes into line with a hook former shown in detail in Figs. 24 to 28, and consisting of a head 207, which is projected toward the turret and over the face of which there rotates a plate 208, carrying a relatively large and more nearly central hook forming stud 209, and a smaller slidingly mounted bending stud 210. The rotating plate 208, is carried by a shaft 211, which passes rotatably through the head 207, and this head is fixed on the inner end of a guide rod 211a, sliding in a bracket 212. The shaft 211 has splined on it a pinion 213, Fig. 3, engaged by gear 214, carrying a pinion 215, engaged by a horizontal rack 216, connected by a turnbuckle link 217, with lever 218, operated from cam 219, on the back cam shaft 21.

Figures 24, 25:
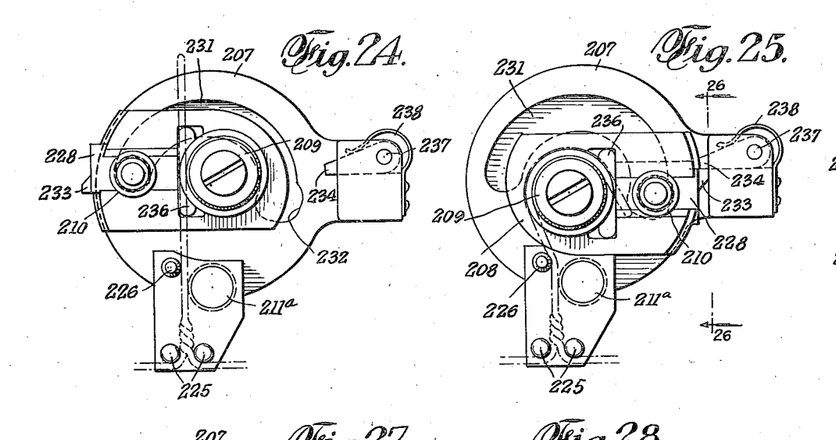
Figs. 24 and 25 are face views of the hook former in the starting and finishing positions.
Figure 26:
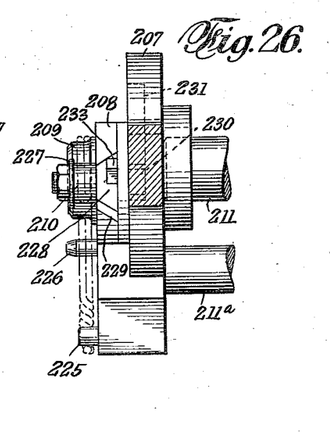
Fig. 26 is a broken sectional view as on substantially the plane of line 26—26 of Fig. 25.
Figure 27:
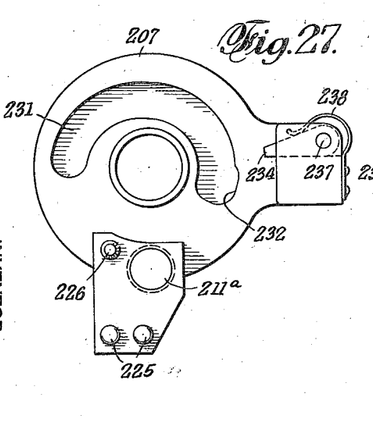
Fig. 27 is a face view of the base or cam portion of the hook former and Fig. 28 is a similar view of the rotating member of the hook former.

The projecting and retracting movements of the hook forming shaft 211, are accomplished from a cam 220, on shaft 21, operating a lever 221, connected by turnbuckle link 222, with one arm of a bell crank 223, the opposite arm of which has a rotatable connection at 224, with the outer end of shaft 211.

As the hooking head advances toward the turret, spaced guides 225, at the lower part of the head pass to opposite sides at the base of the twisted shank and the straight parallel portions of the shank enter edgewise as in Fig. 24, between the internal hook bending former 209, and an external backing and forming stud 226. Then as the shaft 211 turns right-handedly to the Fig. 25 position, the internal hook former 209, because of its eccentric disposition, will force the hook strands to the left over the backing stud 226, and the smaller external forming roller in travelling to the right will roll the strands down around the internal member, finishing the strands in the parallel hook forming relation shown in Fig. 25.

The hook forming roll 210, is shown as flanged at 227, to confine and hold the parallel strands and the radial position of this roll is accomplished and controlled by mounting it on a slide 228, operating in a radial guide 229, in the rotating part of the hook former, said slide having at the back a roll 230, traveling in and guided by an eccentric cam groove 231, in the face of the hook former head 207. This cam groove is outwardly relieved at the finishing end of the same as at 232, Figs. 25 and 27, so that the flanged bending roll 210 may quickly clear the tip of the hook upon completing its bending movement. In order that this relief may be quite sudden, the slide 228, which carries the roll is shown as having a control projection 233, for cooperation with an abutment 234, and having an abruptly angled side adapted to snap past this abutment when the position shown in Fig. 25 is reached. The parts are so related that just prior to the cam roll 230 reaching the relief 232, the control lug 233, will come in register with the abutment 234, to thus hold the slide and prevent the cam roll taking advantage of the relief until after the abrupt shoulder of lug 23 passes the similarly abrupt shoulder of the holding abutment 234, whereupon, with the cam roll in the widened part of the cam track, the slide will snap out as in Fig. 25, to clear the flanged roll of the just completed hook.

Figure 28:
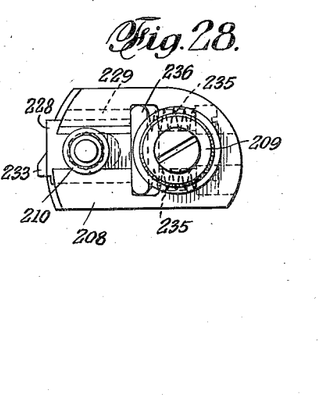

This quick relief movement is aided and largely accomplished by springs 235, Fig. 28, acting against a thrust bar 236, to force the bending roll slide outwardly.

After the hook forming mechanism has accomplished its purpose, it is retracted clear of the hook and the rotary parts of the same turned back to the initial position shown in Fig. 24. In turning back, the control lug 233, which has slipped past the control abutment 234, Fig. 25, operates as a detent to rock the abutment about its center of support 237, against the tension of spring 238.

The completed hanger is removed from the side of the turret by transfer mechanism consisting in the machine illustrated of gripper arms 239, on rock shaft 240, Figs. 29, 30, having a pinion 241, engaged by a vertical reciprocating rack 242, operated from lever 243a, Fig. 8, which lever is rocked by a cam 242a on the lower front cam shaft 19. The gripper mechanism is shown as consisting in each instance of a pair of gripper jaws 243, 244, pivoted on the gripper arms at 245, 246, the first having an outer position fixed by a stop screw 247, and the second pressed toward the first by a closing spring 248. The inner jaws 244, are shown as notched at 249, to take the lower spreader bar portion of the hanger and the upper or outer jaws are shown as inclined at 250, to pass over the spreader bar and cause the latter to wedge open the lower inner jaws as in Fig. 29. Stop screws 251, determine the upper, hanger taking position of the grippers.

Slightly before or at the time the grippers take hold of the hanger, the slide 99, Fig. 29, which at such time has received the cam roll 94, of the first bender operating rack is lowered by cam 102, Fig. 8, to open up these benders as indicated in Fig. 30, so as to release the completed hanger from the internal forming and shaping structure on the face of the turret. Consequently, the hanger is free to be lifted off by the transfer grippers. The path of removal is indicated by the broken lines in Fig. 29. In practice, the gripper jaws may be positively closed to firmly hold the hanger in a definite angular relation, for instance, so that the hook 7, of the same will trail back sufficiently to engage and ride down over the inwardly projecting end of a supporting rail or rod 252, Figs. 3 and 29. The means for such purpose are shown as stationary cam tracks 253, in the paths of rollers 254, on the inner movable gripper jaws 244. To positively open the jaws toward the end of the removal stroke, these movable jaws may be opened by the abutments 255, thereon, riding over the jaw opening inclines 256, Fig. 29. The structure shown in Fig. 29a differs from that described, in that the jaws 244' are mounted for sliding movement in the gripper arms 239'.

To definitely displace the spreader bar portion from the notches 249, in the grippers, substantially U-shaped springs such as indicated at 257, may be interposed between the companion jaws, which as the inner jaws are open as indicated at the bottom in Fig. 29, will lift the bar out of these notches. Guards or guides such as indicated at 258, in Fig. 29, may be provided for directing the hangers off the turret to the supporting or receiving station.

The turnbuckles 217 and 222, Fig. 3, in the linkage to the hook forming devices, enable the making of adjustments that may be desirable or necessary to set the double strands of the hook to the desired conformation. Similarly, the adjustment provided at 259, Figs. 3 and 5, in the linkage for the shank twisting operation, permits sufficient turn being given the shank to set the parallel strands in the desired position, that is, in a plane at right angles to the general plane of the hanger.

By performing the operations in successive stages, the mechanism is kept relatively light and simple, complications are avoided and high production is attained. The first, shoulder forming benders are carried by the turret and are utilized as means for holding the partly formed hanger in position for successive operations. The other bending, welding, twisting, hooking and discharging devices are all located off at the sides of the turret in position to operate on the blank, as soon as the turret brings the blank around to that particular station. These operations may thus be distributed according to time required, to effect a proper balance and to save any waste of time. Aside from a proper distribution of power, this speeds up production and has other advantageous effects. A hanger is completed and discharged at each indexing of the turret. The turret sides may be faced off smoothly to serve as a back guide for the wire, the bending devices which operate over these faces being grooved or shouldered as indicated at 260, to grip the wire.

While of particular importance in the manufacture of wire coat hangers, it will be realized that the invention is of broad scope. The terms employed herein therefore have been used in a descriptive rather than in a limiting sense and are to be so construed, except possibly as limitations may be imposed by state of the prior art.

I claim:

1. The herein disclosed method of forming coat hangers, which comprises uniting the ends of a length of wire in a continuous endless loop, doubling adjoining side portions of said continuous loop together into substantially parallel relation connected by a rounded bend, twisting the base of said parallel portions and then bending the remainder of said connected parallel portions into a supporting hook composed of the parallel strands of wire connected by the rounded bend at the tip of the hook.

2. The herein disclosed method of forming a coat hanger, which comprises bringing the ends of a length of wire together and uniting them to form the wire in a continuous endless loop, bending in the sides of said continuous loop to form the shoulder portions of the hanger and a doubled portion projecting from said shoulder portions, twisting said doubled portion at its junction with the shoulder portions and bending said doubled portion beyond said twist into the form of a double supporting hook.

3. The herein disclosed method of forming a coat hanger, which comprises bringing the ends of a length of wire together and uniting them to form a continuous endless wire loop, shaping said continuous wire loop in shoulder forming portions connected by a doubled shank portion and bending and twisting said doubled shank portion into the form of a supporting hook having a twisted connection with said shoulder portions.

4. The herein disclosed method of forming a coat hanger, which comprises doubling a length of wire into parallel closely adjoining portions connected by a bend, hooking and twisting said doubled portions and as steps in the method, connecting the ends of the wire together and bending parts of the wire below the twisted part into shoulder forming portions connected across the bottom by a spreader portion.

5. The herein disclosed method of forming a coat hanger, which comprises bringing the ends of a length of wire together and butt welding the same to form a continuous endless loop, doubling portions of said loop together into closely adjoining strands connected by a rounded bend, at one stage in the manufacture, shaping the rest of the endless loop into shoulder forming portions connected across the bottom by a continuous integral spreader portion and, in the course of the complete method twisting the closely adjoining doubled portions together at the junction with the shoulder forming portions and bending said doubled portions into the shape of a supporting hook.

6. The herein disclosed method of forming a coat hanger, which comprises permanently securing the ends of a length of wire together to form a continuous endless loop, doubling and twisting the doubled portions at said joint and at one stage in the operations bending the doubled portions into a supporting hook.

7. The herein disclosed method of forming a coat hanger, which comprises bending a length of wire into generally triangular shape and connecting the ends of the wire in that shape to form a continuous endless triangular loop, bending together the opposite sides at the apex of the triangular loop to form a double strand stem portion rising from shoulder portions connected across the bottom by a spreader portion, twisting said parallel portions at their juncture with the shoulder forming portions and then bending said parallel portions above said twisted part into the shape of a supporting hook.

8. The herein disclosed method of forming a coat hanger, which comprises shaping a length of wire in triangular form with the ends abutting and welding or similarly securing said abutted ends in said triangular loop formation, breaking in adjoining sides of said triangular loop to the shape of shoulder forming portions connected across the bottom by a spreader portion and closely adjoining substantially parallel portions rising from said shoulder portions and connected at the top by a rounded bend and then shaping said closely adjoining substantially parallel portions into a double hook having a twisted neck portion.

9. The herein disclosed method of forming a coat hanger, which comprises shaping a length of wire in triangular form with the ends abutting and welding or similarly securing said abutted ends in said triangular loop formation, breaking in adjoining sides of said triangular loop to the shape of shoulder forming portions connected across the bottom by a spreader portion and closely adjoining substantially parallel portions rising from said shoulder portions and connected at the top by a rounded bend, twisting said parallel portions at their juncture with the shoulder forming portions and then bending said connected parallel portions above said twist into the form of a supporting hook.

10. The method of forming a coat hanger, which comprises bending a length of wire into the form of a substantially triangular loop and indenting the side portions of said loop near the base of the triangular formation and further bending said triangular loop structure beyond said indented portions into a double strand supporting hook.

WILLIAM BACKER.